Aug. 12, 1941.   C. PASQUARELLA, JR   2,252,027
CLAMP FOR NONSKID DEVICES
Filed July 9, 1940   2 Sheets-Sheet 1

Inventor
CLEMENT PASQUARELLA, JR.

By Clarence A. O'Brien

Attorney

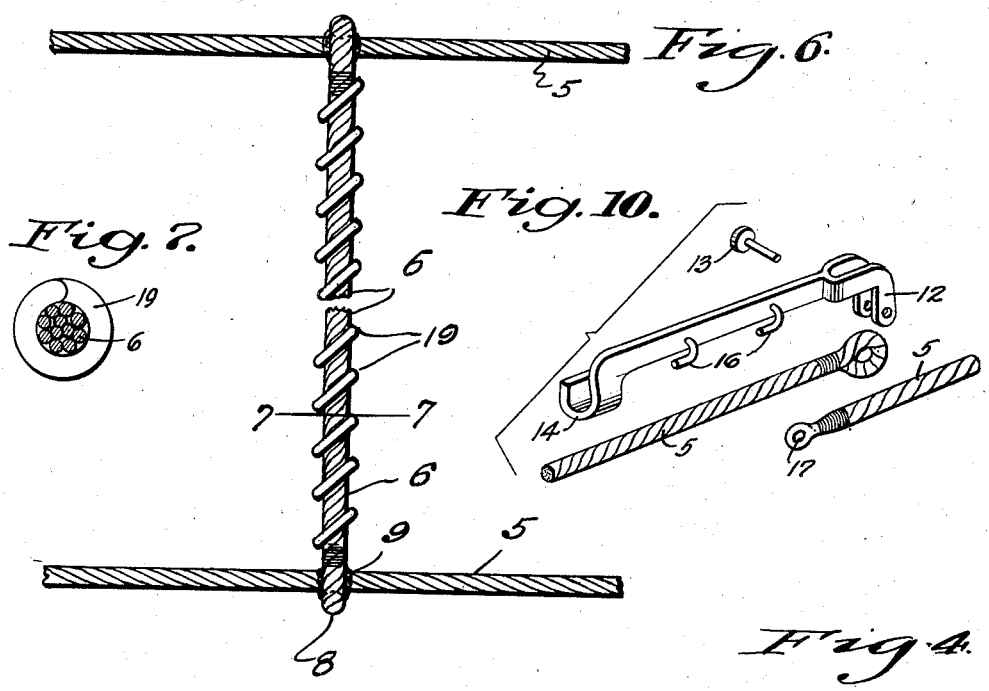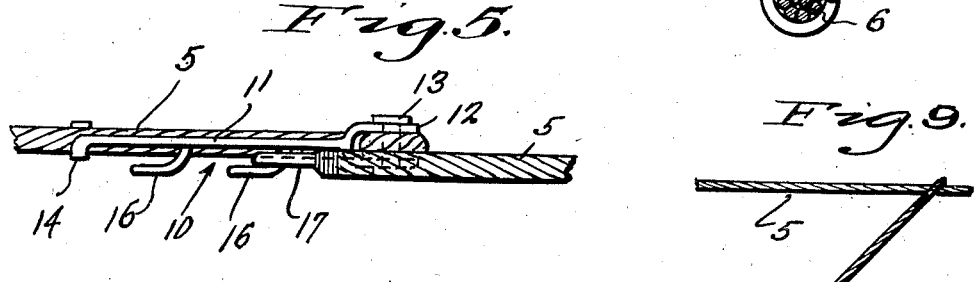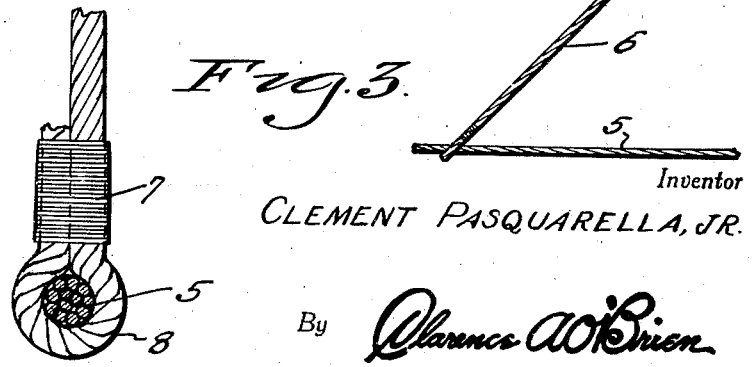

Patented Aug. 12, 1941

2,252,027

UNITED STATES PATENT OFFICE 2,252,027

CLAMP FOR NONSKID DEVICES

Clement Pasquarella, Jr., Ridgefield, Conn.

Application July 9, 1940, Serial No. 344,575

1 Claim. (Cl. 24—70)

This invention relates to a clamp for a non-skid device such as is adapted to be attached to a pneumatic tire to prevent side slipping and spinning of the drive wheels of a vehicle; and the invention together with its objects and advantages will be best understood from a study of the following description taken in connection with the accompanying drawings wherein:

Figure 3 is a fragmentary detail view partly in section and partly in elevation and showing the manner of securing a cross-member to a side member of the non-skid device.

Figure 4 is a detail sectional view taken substantially on the line 4—4 of Figure 1.

Figure 5 is a fragmentary detail plan view showing the improved clamp.

Figure 6 is a fragmentary plan view of a slightly modified form of anti-skid device.

Figure 7 is a detail sectional view taken substantially on the line 7—7 of Figure 6.

Figure 9 is a view somewhat similar to Figure 6 and showing one of the cross-members arranged diagonally.

Figure 10 is an exploded view of the clamping means.

Referring more in detail to the drawings, it will be seen that in each of the several forms of the invention the anti-skid device comprises side members 5 in the forms of stranded wires and cross-members 6 also in the forms of stranded wires.

The cross-members 6 have the respective opposite ends thereof bent back and secured to the main body portions thereof as at 7 and as shown in Figure 3 to provide eyes 8 through which the side members 5 are trained.

Figure 1:
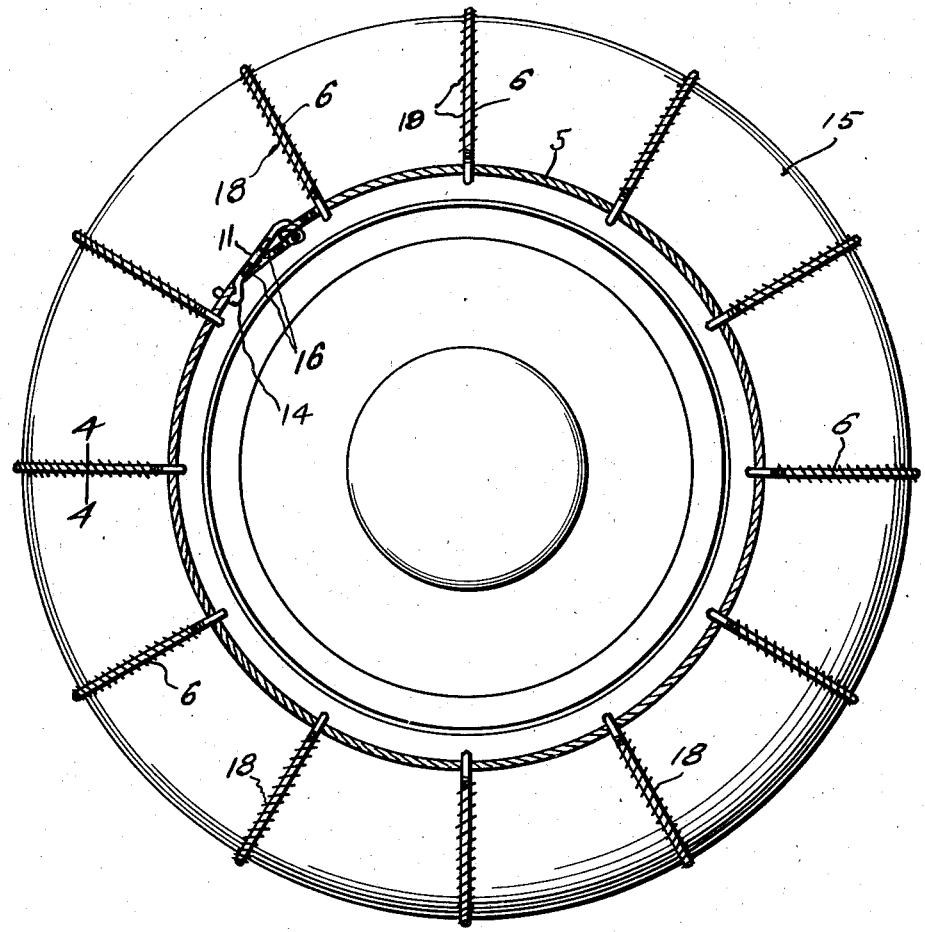
Figure 1 is an elevational view of the outboard side of an automobile wheel equipped with a non-skid device clamp embodying the features of the present invention.

The eyes 8 are welded or otherwise more or less permanently secured to the side members 5 as at 9, and as shown in Figures 1 and 6, the cross-members 6 may extend straight across the tire casing at substantially right angles to the side members 5, or may be disposed diagonally as shown in Figure 9.

Further in accordance with the present invention either or both of the side members 5 may be equipped with a novel fastener or clamps such as best shown in Figures 5 and 10 and indicated generally by the reference numeral 10.

The improved fastener or clamp 10, in accordance with this invention and as best shown in Figs. 5 and 10, consists of a lever 11 formed at one end with a fork to provide a pair of prongs 12, the outer ends of which are bent at right angles to the rest of the prongs and the extremities of the bent ends are apertured. These bent ends receive therebetween an end of a side member 5 and the fork is pivoted to said end through the medium of a bolt 13 as shown in Figure 5. The free end of the lever 11 is formed with a hook 14 which is of the shape shown in Figure 10 to engage the said end of the side member 5 to secure the non-skid device on the pneumatic tire 15.

Also the lever 11 is provided with two or more hooks 16 spaced longitudinally on the lever for cooperation with an eye 17 suitably secured on the complemental end of the side member as shown in Figures 5 and 10; it being apparent that to secure the anti-skid device on the tire, the eye member 17 is first engaged with a selected one of the hooks 16 after which the lever 11 is rotated to the position shown in Figure 5 for engaging the hook 14 of the lever with that end of the side member 5 to which the lever is pivoted. With the parts in the position shown in Figure 5 the anti-skid device will be held securely on the tire.

Figure 2:
Figure 2 is a plan view of a coil armor member forming part of the non-skid means.
Figure 8:
Figure 8 is a fragmentary plan view of a third form of armor forming part of a cross-member of the device.

Also in accordance with the present invention each cross-member 6 is preferably provided with an encircling member, and the member, as shown in Figures 1 and 2, may be in the form of an elongated wire coil 18; or said member may be in the form of individual rings, such as shown in Figures 6 and 7, and indicated by the reference numeral 19; and these rings 19 may be either directly welded individually to the cross-member 6, or may be connected together in spaced relation through the medium of short links 20, and as shown in Figure 8, in which figure said links are indicated by the aforementioned reference numeral 20, and the rings connected by said links by the reference numeral 19'.

Among the advantages of a non-skid device embodying the features of the present invention may be mentioned that such a device will be positive in preventing side slipping and spinning of the drive wheel; that the cross-members of the device are not likely to easily become broken; and that replacement of worn or broken parts may be quickly and easily made.

It will be observed that the principal phase of the invention stressed and claimed is the clamp, this being shown to greatest advantage in Figures 5 and 10.

It is thought that a clear understanding of the construction, utility, and advantages of a non-skid device embodying the features of the present invention will be had without a more detailed description thereof.

It is also to be understood that while I have herein illustrated and described the preferred embodiment of the invention, it is in no wise intended to restrict the invention to the precise details of construction, combination and arrangement of elements as so illustrated and described, other than as may be required by the prior art and scope of the appended claim.

Having thus described the invention what is claimed as new is:

A clamp for connecting together end portions of a flexible side member of a non-skid device, said side member having an eye at each end thereof, said clamp comprising a lever, a fork at one end of the lever providing a pair of prongs, free end portions of said prongs being bent at right angles to the other parts of the prongs and the extremities of the bent portions having perforations therein, a pivot pin passing through the perforations of the prongs and through the eye at one end of the member, the other end of the lever having a laterally extending hook connected to one side edge thereof with the hook of somewhat more than a semi-circular shape to frictionally receive a portion of the side member adjacent that end to which the lever is pivoted, and spaced hooks on intermediate portions of the lever for selectively receiving the eye at the other end of the side member.

CLEMENT PASQUARELLA, Jr.